United States Patent
Hu et al.

(10) Patent No.: US 8,812,196 B2
(45) Date of Patent: Aug. 19, 2014

(54) SYSTEM AND METHOD FOR PAYLOAD ESTIMATION

(75) Inventors: Zheng Hu, Peoria, IL (US); Jason D. Bell, Dahinda, IL (US)

(73) Assignee: Caterpillar Inc., Peoria, IL (US)

( * ) Notice: Subject to any disclaimer, the term of this patent is extended or adjusted under 35 U.S.C. 154(b) by 137 days.

(21) Appl. No.: 13/617,812

(22) Filed: Sep. 14, 2012

(65) Prior Publication Data
US 2014/0081530 A1    Mar. 20, 2014

(51) Int. Cl.
| | | |
|---|---|---|
| G06F 19/00 | (2011.01) | |
| G06F 7/70 | (2006.01) | |
| G06G 7/00 | (2006.01) | |
| G06G 7/76 | (2006.01) | |

(52) U.S. Cl.
USPC .............................. 701/50; 180/170; 340/988

(58) Field of Classification Search
USPC ......... 701/50, 31.4, 532, 1, 80; 180/326, 315, 180/215; 107/23, 33; 414/694; 340/438, 340/439; 221/276
See application file for complete search history.

(56) References Cited

U.S. PATENT DOCUMENTS

| | | | | |
|---|---|---|---|---|
| 3,727,781 | A * | 4/1973 | Ramsey | 414/642 |
| 4,823,268 | A * | 4/1989 | Giles et al. | 701/50 |
| 5,941,921 | A * | 8/1999 | Dasys et al. | 701/50 |
| 6,879,889 | B2 * | 4/2005 | Ross | 701/22 |
| 7,089,099 | B2 * | 8/2006 | Shostak et al. | 701/29.6 |
| 7,206,702 | B2 * | 4/2007 | Isono et al. | 702/41 |
| 7,894,961 | B2 * | 2/2011 | Blackburn et al. | 701/50 |
| 7,912,612 | B2 * | 3/2011 | Janardhan et al. | 701/50 |
| 8,095,281 | B2 * | 1/2012 | Peterson et al. | 701/50 |
| 8,112,202 | B2 * | 2/2012 | Fackler et al. | 701/50 |
| 8,126,619 | B2 * | 2/2012 | Corder et al. | 701/50 |
| 8,660,758 | B2 * | 2/2014 | Janardhan et al. | 701/50 |
| 2014/0039767 | A1 * | 2/2014 | Jensen | 701/50 |
| 2014/0081530 | A1 * | 3/2014 | Hu et al. | 701/50 |

* cited by examiner

*Primary Examiner* — Thomas Black
*Assistant Examiner* — Robert Payne
(74) *Attorney, Agent, or Firm* — Jeff A. Greene

(57) ABSTRACT

A payload estimation system for a work machine is provided. The system includes a power source, a payload carrier, an actuator and a controller. The payload carrier is configured to contain a payload of material. The actuator is configured to effectuate movement of the payload carrier. The controller is configured to control an operation of the actuator. The controller is also configured to receive one or more parameters associated with the power source of the work machine, during an operation of the payload carrier. Further, the controller is configured to compare the one or more parameters with a pre-determined dataset to estimate a weight of the payload on the work machine.

20 Claims, 3 Drawing Sheets

SYSTEM AND METHOD FOR PAYLOAD ESTIMATION

TECHNICAL FIELD

The present disclosure relates to material dump monitoring systems and more particularly to payload estimation for a work machine.

BACKGROUND

A demand exists for payload estimation on dump trucks. Displaying a payload volume to an operator facilitates in enhancing the truck safety. For example, U.S. Pat. No. 8,126,619 relates to a method of determining weight of a payload lifted by a rig of a load lifting machine, and/or an apparatus system. The weight is determined from at least one parameter being or indicative of the force or pressure existing in or applied by the rig while the payload is lifted and a compensation for friction and/or other losses in the rig.

SUMMARY OF THE DISCLOSURE

In one aspect of the present disclosure a payload estimation system for a work machine is provided. The system includes a power source, a payload carrier, an actuator and a controller. The payload carrier is configured to contain a payload of material. The actuator is configured to effectuate movement of the payload carrier. The controller is configured to control an operation of the actuator. The controller is also configured to receive one or more parameters associated with the power source of the work machine, during an operation of the payload carrier. Further, the controller is configured to compare the one or more parameters with a pre-determined dataset to estimate a weight of the payload on the work machine.

In another aspect, a method for estimating a payload on a work machine is provided. The method actuates a movement of a payload carrier for a pre-determined displacement. The method also receives one or more parameters associated with a power source of the work machine, during the pre-determined displacement. Further, the method compares the one or more parameters with a pre-determined dataset to estimate the weight of the payload on the work machine.

Other features and aspects of this disclosure will be apparent from the following description and the accompanying drawings.

DETAILED DESCRIPTION

Figure 1:
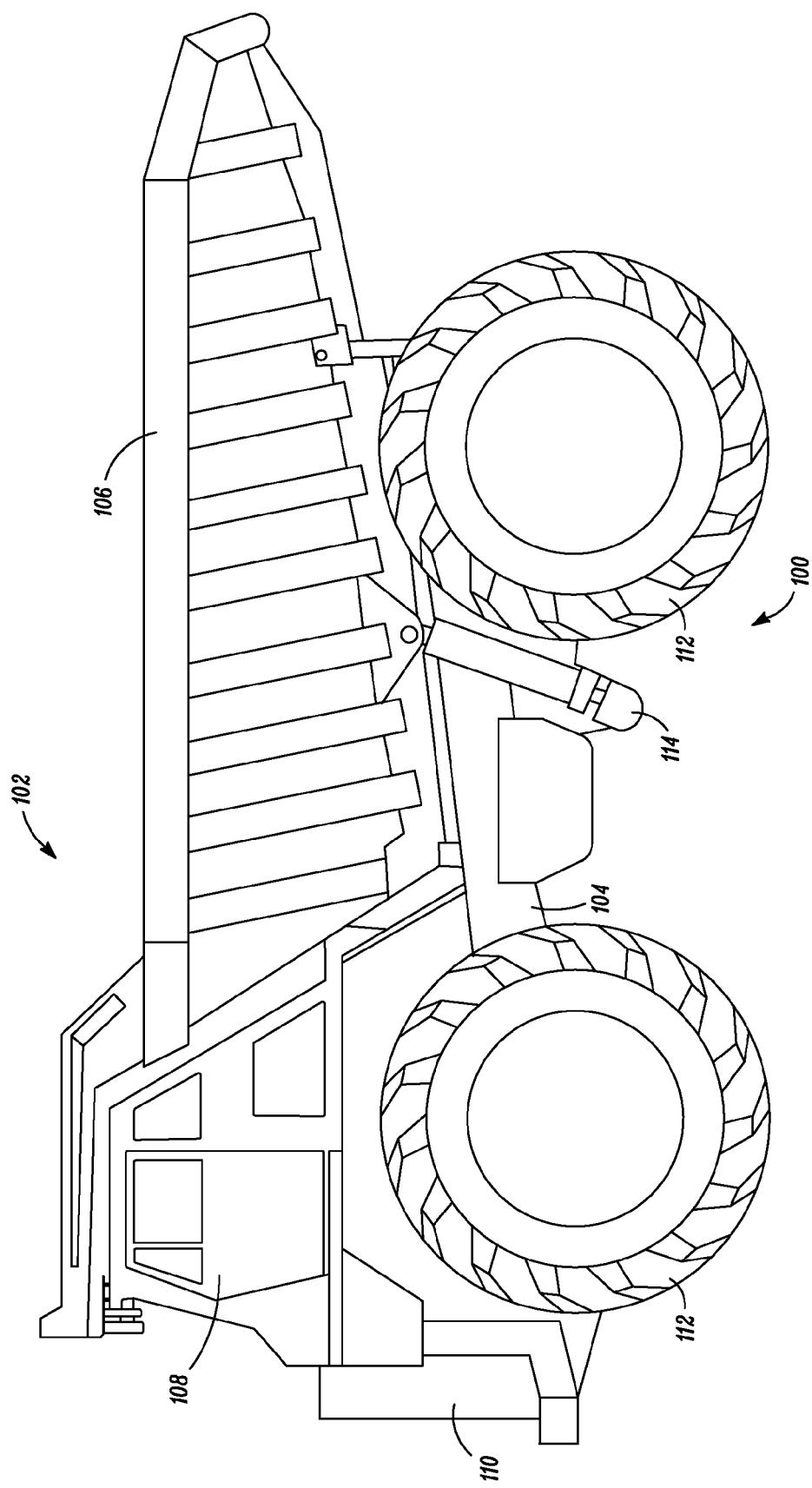
FIG. 1 is a diagrammatic view of an exemplary work machine, according to one embodiment of the present disclosure.

FIG. 1 illustrates an exemplary work machine 100, according to one embodiment of the present disclosure. More specifically, as shown in the accompanied figures, the work machine 100 may embody a large mining truck 102. It should be understood that the work machine 100 may alternatively include an off-highway truck, a quarry truck, an articulated truck, or any other suitable construction machine having a hauling unit.

Referring to FIG. 1, the large mining truck 102 may include a frame 104. A payload carrier 106 may be pivotally mounted to the frame 104. Further, an operator cab 108 may be mounted to the frame 104, such as, e.g., above an engine enclosure 110 and on a front part of the frame 104. The large mining truck 102 may be supported on the ground by a plurality of wheels 112. A person of ordinary skill in the art will appreciate that one or more power sources (not shown) may be housed within the engine enclosure 110. The power source may include an internal combustion engine, a natural gas engine, a hybrid engine, or any combination thereof. The power source may provide power to the wheels 112 and a final drive assembly, via a mechanical or electric drive train.

In one embodiment, the large mining truck 102 may be configured to carry variable amounts of payload in the payload carrier 106. The payload carrier 106 may be capable of movement such that the payload contained in the payload carrier 106 may be dumped from the work machine 100 during a dump cycle. To this end, an actuator 114 may be attached to the payload carrier, such that the actuator 114 is configured to effectuate movement of the payload carrier. In one example, the actuator 114 may include hydraulic cylinders.

The present disclosure relates to a payload estimation system 200 for the work machine 100. The payload estimation system 200 may include a controller 202 which is configured to control an operation of the actuator 114. Further the controller 202 is configured to receive one or more parameters associated with the power source of the work machine 100. The controller 202 may also compare the one or more parameters with a pre-determined dataset to estimate a weight of the payload on the work machine 100.

Figure 2:
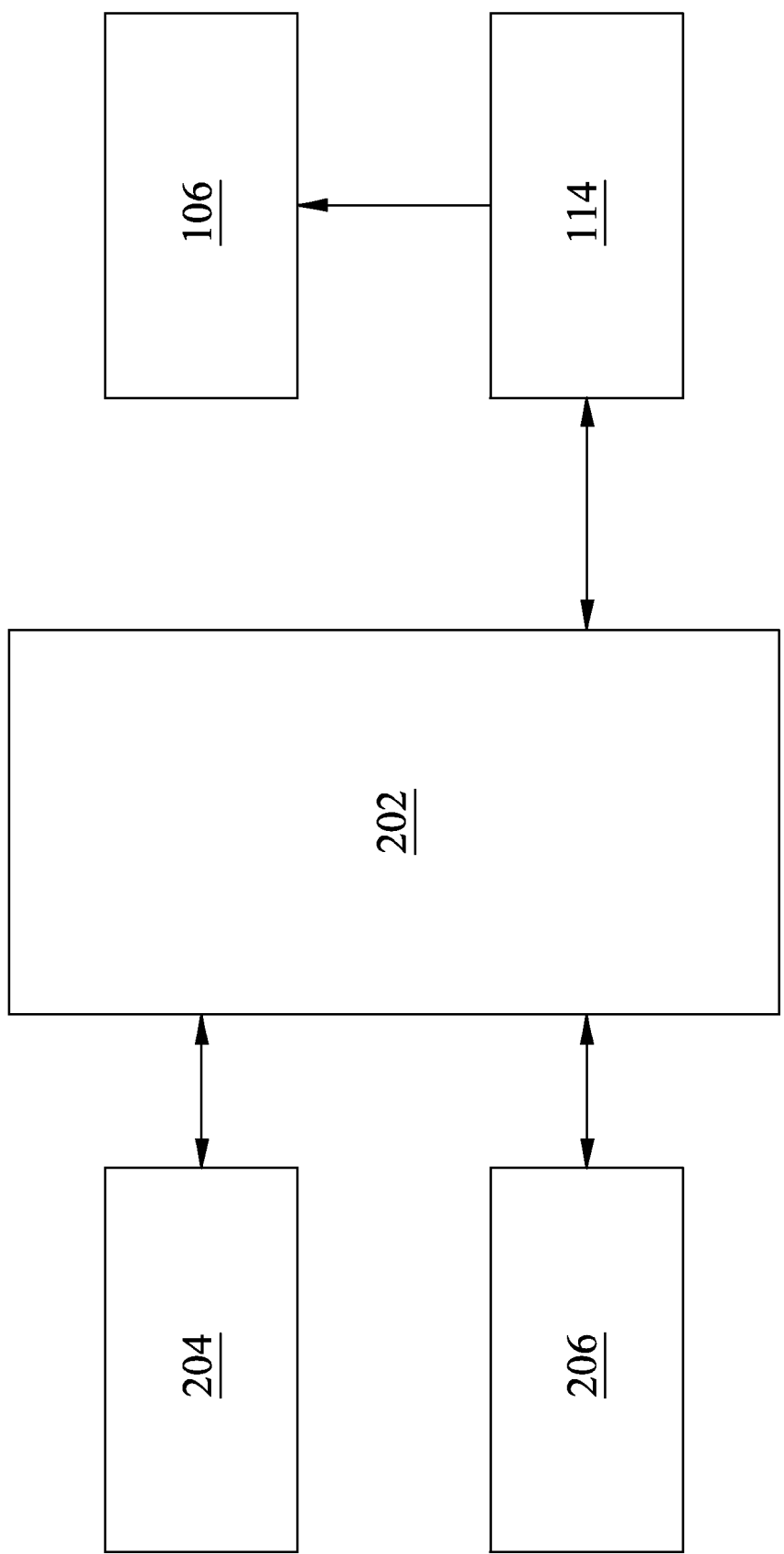
FIG. 2 is an schematic view of a payload estimation system for the work machine.

Referring to FIG. 2, the controller 202 may be communicably coupled to an operator input module 204 and a parameter input module 206. In one embodiment, the controller 202 is configured to receive one or more inputs from an operator via the operator input module 204. These one or more inputs may be indicative of machine status. Furthermore, the controller 202 may determine the completion of the loading process based on the machine status. For example, the one or more operator inputs may include, but not limited to, signals received from a parking brake, service brake, shift lever, horn, and the like. In one embodiment, the one or more inputs from the operator input module 204 may be periodically received after a pre-determined period of time.

Further, as shown in FIG. 2, the controller 202 may be communicably coupled to the actuator 114. The controller 202 may be configured to trigger a movement of the payload carrier 106 via the actuator 114. On determination of the completion of the loading process, the controller 202 may issue control signals to the actuator 114 in order to actuate the movement of the payload carrier 106 for a pre-determined displacement or a pre-determined time period. In one example, the controller 202 may issue control signals to the actuator 114 to open a hoist valve in order to start raising the payload carrier 106. Further, once the pre-determined displacement is reached, the controller 202 may issue appropriate control signals to stop raising and lower carrier back down. It should be noted that this process of lifting the payload carrier 106 for the pre-determined displacement may be referred to as a tentative hoist. During the tentative hoist, the displacement may be limited and the speed may be low in order to minimize disturbance.

Also, during the movement of the payload carrier 106, the controller 202 may receive one or more parameters associated with the power source of the work machine 100 via the parameter input module 206. In one embodiment, the one or more parameters may include at least one of a speed and torque of the power source, and fuel consumption of the work machine 100. It should be noted that the one or more parameters may be obtained by any method known in the art. For example, in one embodiment, the one ore more parameters may be obtained from an engine control logic present within the work machine 100.

A person of ordinary skill in the art will appreciate that the one or more inputs and the parameters described herein are merely on an exemplary basis and do not limit the scope of this disclosure. Moreover, the operator input module 204 and/or the parameter input module 206 may either be directly coupled to various sensors or components within the work machine 100 or may indirectly derive the one or more inputs or parameters through computations performed on measured signals. Also, the operator input module 204 and the parameter input module 206 may either be intrinsic or extrinsic to the controller 202, without any limitation.

Further, the controller 202 may be communicably coupled to a database. The database may be configured to store the predetermined dataset including a calibrated map between the one or more parameters associated with the power source and the weight of the payload on the work machine 100. It should be noted that the database may provide for storage and retrieval of the pre-determined dataset. The controller 202 may be configured to compare the one or more parameters received from the parameter input module 206 with the pre-determined dataset to estimate the weight of the payload on the work machine 100 for the pre-determined displacement.

In one embodiment, the control algorithm may also include a payload counter. The payload counter may be configured to record the occurrence of the dump cycle, based on the displacement of the payload carrier 106 operated by the operator. For example, a pre-determined body angle of the payload carrier 106 and/or the displacement of the payload carrier 106 may be associated with a dump action. In one case, the controller 202 may determine the occurrence of the dump action based on the signals received from the actuator 114. The payload counter may be suitably incremented on the occurrence of the dump action.

In one embodiment, the controller 202 may be configured to estimate the weight of the payload dumped during the dump cycle by mapping against the pre-determined dataset. Based on the payload counter and the weight of the payload dumped in the dump cycle, the controller 202 may be configured to estimate the accumulative weight of the payload dumped by the work machine 100 since a designated beginning The value stored in the payload counter as well as the estimated payload weight may be used to derive a variety of data for analysis and also to provide suitable notifications to the operator. For example, the operator may be notified of the estimated weight of the payload dumped in a single dump cycle. Also, in another example, the operator may be notified of the various weights of the payload dumped in each cycle in a single shift. In yet another example, the operator may be notified of an average weight of the payload dumped over the shift.

It should be noted that the implementation of the database and the storage and retrieval of the dataset and/or the payload counter may be done in a variety of ways known the art. The database may either be a local database and/or a centralized database accessible by a fleet of the work machines 100 from a remote location, such that the suitable data for each of the work machines 100 may be individually accessed or retrieved.

Further, the controller 202 may be configured to notify the operator of the weight of the payload on the work machine 100. In one embodiment, the controller 202 may be communicably coupled to a display module, such as, but not limited to, a monitor, a screen, a display panel, and the like. The notification may be provided to the operator by any suitable visual and/or auditory feedback, for example, a message, a sound clip, and the like.

The controller 202 may embody a single microprocessor or multiple microprocessors that include a means for receiving input from the operator input module 204 and the parameter input module 206 and providing output to the actuator 114 of the work machine 100. Numerous commercially available microprocessors may be configured to perform the functions of the controller 202. It should be appreciated that the controller 202 may readily embody a general machine microprocessor capable of controlling numerous machine functions. A person of ordinary skill in the art will appreciate that the controller 202 may additionally include other components and may also perform other functionality not described herein.

Figure 3:
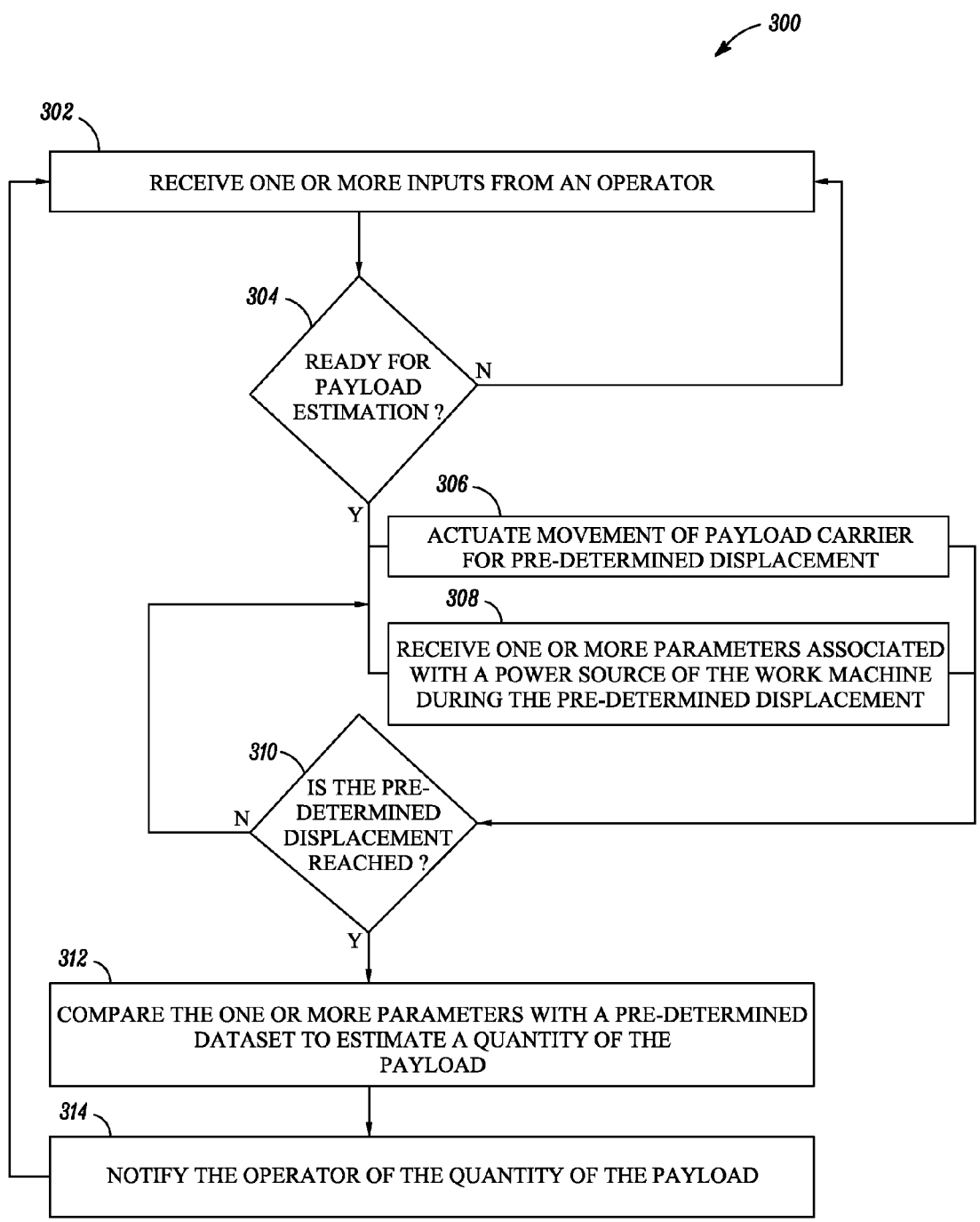
FIG. 3 is flowchart for estimating payload on the work machine.

The method for estimating the payload on the work machine will be described in connection with FIG. 3.

Industrial Applicability

Payload estimation systems are installed on a variety of the work machines 100. Conventionally, the payload estimation systems include sensors installed in different parts of the work machine 100, for example, in a hydraulic lift circuit, in a truck suspension, and the like. In one case, the sensor may be placed at the suspension of the work machine 100 in order to monitor pressure. The monitored pressure may then be correlated to a weight, in order to determine an amount of the payload on the work machine 100.

However, the installation and maintenance of the sensors may prove to be costly. The present disclosure relates to the payload estimation system 200 that does not require additional sensors other than existing ones. Accordingly, no additional machine costs may be incurred and further additional maintenance requirements maybe prevented as well. The payload estimation system 200 described herein may estimate the weight of the payload on the work machine 100 and notify the operator so as to enhance driving safety, engine protection, production rate and fuel economy of the work machine 100. The payload estimation system 200 may be utilized for hauling units present on a variety of the work machines 100.

Traditional methods for computing the amount of the payload dumped in a job session may include multiplying a count of the total number of hauls with a rated load capacity of the work machine 100. Such methods may prove to be erroneous since the actual payload carried by the work machine 100 may deviate from the rated load capacity of the work machine 100. The payload estimation system 200 described herein may provide the payload counter functionality wherein the total weight of the payload dumped over a number of the dump cycles may be estimated by the controller 202.

At step 302, the one or more inputs from the operator may be received via the operator input module 204. Thereafter, at step 304, based on the one or more received inputs, the controller 202 may determine if the loading process is complete. In case the loading process is not yet complete, the controller 202 may continue to receive the one or more inputs from the operator. However, if the loading process is complete, at step 306, the controller 202 may actuate the movement of the payload carrier 106 for the pre-determined displacement. In one example, the controller 202 may issue signals to the actuator 114 and/or control the opening of the hoist valve. The controller 202 may also receive the one or more parameters associated with the power source of the work machine 100 during the pre-determined displacement at step 308. It should be noted that the steps 306 and 308 may be performed simultaneously. As described above, the one or more parameters may include the speed and the torque of the power source, and/or the fuel consumption of the work machine 100.

At step 310, the controller 202 may determine if the pre-determined displacement is reached. In one embodiment, the controller 202 may sense the position of the payload carrier 106 via the actuator 114. If the pre-determined displacement is not reached, the controller 202 may continue to perform the steps 306 and 308. On reaching the pre-determined displacement, the controller 202 may prevent further movement of the payload carrier 106 by closing the hoist valve. Further, the controller 202 may compare the one or more parameters with the pre-determined dataset at step 312.

In one example, the controller 202 may access appropriate readings from the dataset stored in the database and map the received one or more parameters with the same. This mapping may be performed by any method known in the art and may also include performing certain mathematical functions like obtaining an average of the one or more parameters or rounding off certain readings as the case maybe. Such techniques are known in the art and lie within the scope of the disclosure. As described above, the pre-determined dataset may include the calibrated map between the one or more parameters associated with the power source and the weight of the payload. The calibrated map may be pre-stored in the database.

Thereafter, at step 314, the controller 202 may notify the operator of the weight of the payload based on the comparison made. In one embodiment, the payload counter may also be maintained by payload estimation system 200. The payload counter may be used to record the number of dump cycles performed by the work machine 100. Further, the weight of the payload dumped and the payload counter may be utilized to estimate the total weight of the payload dumped by the work machine 100 in the pre-determined time period.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A payload estimation system for a work machine, the system comprising:
   a power source;
   a payload carrier configured to contain a payload of material;
   an actuator configured to effectuate movement of the payload carrier; and
   a controller configured to:
      control an operation of the actuator;
      receive one or more parameters associated with the power source of the work machine, during an operation of the payload carrier; and
      compare the one or more parameters with a pre-determined dataset to estimate a weight of the payload on the work machine.

2. The system of claim 1, wherein the power source of the work machine is an internal combustion engine.

3. The system of claim 1, wherein the work machine is a dump truck.

4. The system of claim 1, wherein the controller is configured to control the operation of the actuator for a pre-determined displacement.

5. The system of claim 1, wherein controller is further configured to receive one or more inputs from an operator of the work machine.

6. The system of claim 5, wherein the operation of the actuator is based on the received one or more inputs from the operator.

7. The system of claim 1, wherein the one or more parameters associated with the power source includes a speed and a torque of the power source, and a fuel consumption of the work machine.

8. The system of claim 1, wherein the pre-determined dataset includes a calibrated map between the one or more parameters associated with the power source and the weight of the payload on the work machine.

9. The system of claim 1 further including a payload counter configured to record a dump cycle based on a displacement of the payload carrier.

10. The system of claim 9, wherein the controller is configured to compare the one or more parameters associated with the power source and pre-determined dataset during the dump cycle to estimate the weight of the payload dumped during the dump cycle.

11. The system of claim 1, wherein the controller is further configured to notify an operator of the weight of the payload on the work machine.

12. The system of claim 1, wherein the machine includes any one of an off-highway truck, a quarry truck, and an articulated truck.

13. The system of claim 1, wherein the power source is configured to supply power to the actuator.

14. A method of estimating a payload on a work machine comprising:
   actuating a movement of a payload carrier for a pre-determined displacement;
   receiving one or more parameters associated with a power source of the work machine, during the pre-determined displacement; and
   comparing the one or more parameters with a pre-determined dataset to estimate a weight of the payload on the work machine.

15. The method of claim 14 further including receiving one or more inputs from an operator of the work machine.

16. The method of claim 15 wherein the movement of the payload carrier is based on the received one or more inputs from the operator.

17. The method of claim 14 further including notifying an operator of the weight of the payload on the work machine.

18. The method of claim 14 further including receiving a grade signal associated with the work machine.

19. The method of claim 14 further including receiving a signal associated with a throttle command.

20. A computer based system comprising:
   a communication interface communicating with a memory;
   the memory configured to communicate with a processor; and
   the processor, in response to executing a computer program, performs operations comprising:
      actuating a movement of a payload carrier for a pre-determined displacement;
      receiving one or more parameters associated with a power source of the work machine, during the pre-determined displacement; and comparing the one or more parameters with a pre-determined dataset to estimate a weight of a payload on the work machine.

\* \* \* \* \*